July 13, 1965 J. S. CUBERT 3,194,981
TUNNEL DIODE LOGIC CIRCUIT FOR PERFORMING THE NOR FUNCTION
Filed Oct. 31, 1961 3 Sheets-Sheet 1

INVENTOR
JACK SAUL CUBERT
BY G. Donald Weber, Jr.
AGENT

United States Patent Office 3,194,981
Patented July 13, 1965

3,194,981
TUNNEL DIODE LOGIC CIRCUIT FOR PERFORMING THE NOR FUNCTION

Jack Saul Cubert, Haddonfield, N.J., assignor to Sperry Rand Corporation, New York, N.Y., a corporation of Delaware
Filed Oct. 31, 1961, Ser. No. 149,099
7 Claims. (Cl. 307—88.5)

This invention relates to a circuit for performing logic functions. In particular, this invention provides a circuit which performs the logical NOR function and utilizes tunnel diodes as the active elements.

In many present day computing machines and the like, various logic circuits are utilized to provide various logic functions. Some of these logic circuits are the AND, the OR, and the NOT logic circuits. Another and newer logic circuit is the NOR logic circuit. This circuit has the advantageous function of providing within one circuit the logic functions which would normally be produced by a combination of a NOT and an OR circuit.

In addition to the utilization of various logic circuits, the various computing machines and the like which are being produced are stressing rapidity of operation. A new component which has been developed which provides extremely fast responses is the tunnel diode. The NOR logic circuit which is the subject of this invention utilizes tunnel diodes as the switching elements whereby extremely fast operation of a NOR circuit may be provided.

The circuit comprises a group of "N" input diodes which are connected to one terminal of a primary winding of a coupling transformer. Another terminal of the coupling transformer may then be connected to a clock pulse source whereby current may be drawn through the primary winding via the input diodes and in accordance with the operating condition of said diodes. This current may be used to switch the switching elements. The secondary winding of the coupling transformer has one terminal thereof connected to a source which may be either a constant current source or a voltage source. Another terminal of the secondary winding of the coupling transformer is coupled to a reset clock source and a switching element (tunnel diode) such that the reset clock source may set the tunnel diode to a predetermined state. At least one of the terminals of the coupling transformer is also coupled to a plurality of output diodes whereby the logical output of the circuit may be obtained in accordance with the state in which the tunnel diode resides.

One object of this invention is to provide a high speed NOR logic circuit.

Another object of this invention is to provide a high speed NOR logic circuit which has wide tolerances and uses tunnel diodes.

Another object of this invention is to provide a NOR logic circuit which can be operated by synchronous or asynchronous logic with level or pulse input signals.

Another object of this invention is to provide a NOR logic circuit which can provide outputs in the form of pulses or levels.

Another object of this invention is to provide a NOR logic circuit which can be operated either synchronously or asynchronously in order that information may be obtained from the circuit either by destructive readout or non-destructive readout.

These and other objects of this invention will become more readily apparent from the following detailed description of the invention taken in conjunction with the accompanying drawings, in which.

Figure 1:
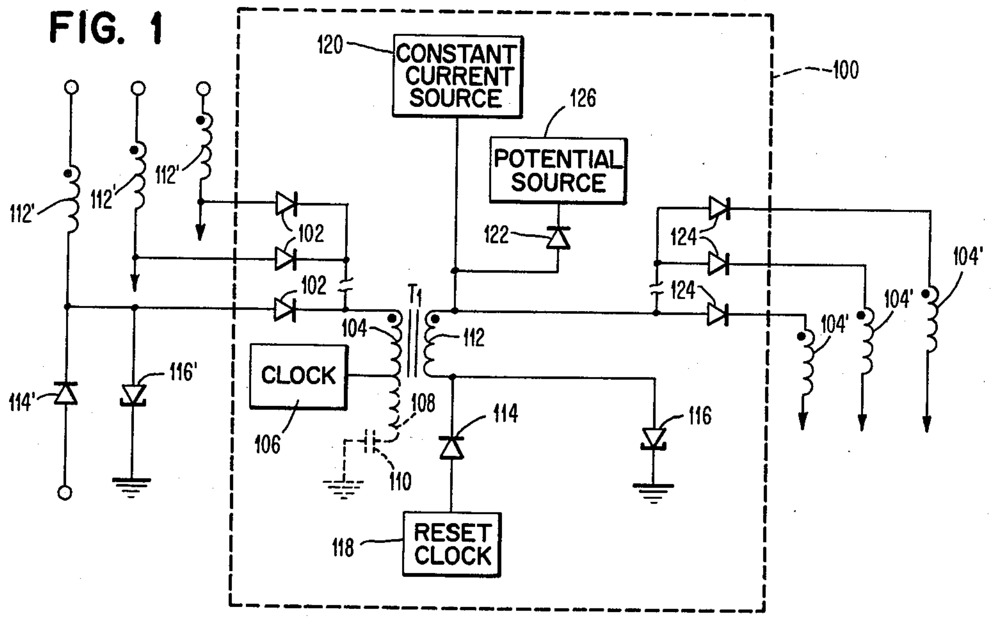
FIGURE 1 is one embodiment of the invention and in particular is designed to operate on positive input signals.

Referring now to FIGURE 1, it should be noted that the circuit portion within the dashed outline 100 represents the NOR logic circuit which is the subject of the invention. The portions outside of the dashed outline 100 represent further input or output circuits of other NOR circuits similar to the one within the dashed outline 100. The elements which are outside of the dashed outline 100 bear similar reference numerals to similar components inside the dashed outline 100 with the exception that the elements outside of the outline have a prime affixed thereto. The diodes 102 are the input diodes. It will be seen that there are shown, for exemplary purposes only, three input diodes 102. By the broken line it is indicated that the inputs may be any number which may be handled by the circuit. For practical purposes, there will be a limitation of about four input diodes to the circuit. However, theoretically and with the improvement of tunnel diode characteristics, it is contemplated that a larger number of input circuits may eventually be accommodated. That is, the circuit would operate identically regardless of the number of inputs applied thereto provided the practical aspects of the tunnel diode characteristics are eventually improved. The anodes of the input diodes 102 are connected to the associated input circuits. The cathodes of the input diodes 102 are connected to one terminal of the primary winding 104 of transformer T1. Because of the polarity of the input diode connection, it is clear that this embodiment is designed for operation in response to positive going input signals. Another terminal of primary winding 104 is connected to clock source 106. The clock source 106 may be any of the well known clock pulse sources for supplying, in preferred embodiments, regularly recurring pulses. Moreover, in the embodiment shown, source 106 should be capable of producing a negative going signal. At the winding terminal to which the clock pulse source is connected, there is shown, in dashed line, a further winding 108 which is connected to ground via capacitor 110. It is to be understood that this winding 108 and serially connected capacitor 110 need not be incorporated into the circuit for proper operation thereof. However, in some circumstances, as will be discussed subsequently, these components may be desirable. The coupling transformer T1 which is utilized may be of a toroidal type and a typical transformer would be a Ferroxcube 4A Bead. The transformer need not have an iron core but better operation is achieved with a suitable iron core. This transformer may have, for example, a 4:1 turns ratio with the secondary winding having the lesser number of turns. In particular, in some applications the secondary winding may actually comprise only a single turn.

The secondary winding of the transformer T1 has one terminal thereof connected to the cathode of diode 114 and to the anode of tunnel diode 116. The cathode of tunnel diode 116 is returned to ground whereas the anode of diode 114 is returned to a reset clock source 118. The reset clock source may be of any type of device which provides pulses (preferably regularly recurring) and in this embodiment of a positive-going nature. In synchronous operation, both the clock source 106 and reset clock source 118 may be recurring sources. It should be understood, of course, that in asynchronous operation these clock sources need not be regularly occurring, but an interdependence is to be ascribed thereto in order that the tunnel diode 116 is always placed in proper condition by the reset clock 118 prior to the application of a pulse by clock source 106.

A second terminal of secondary winding 112 is connected to source 120. For the purposes of this explanation of this embodiment, source 120 may be considered to be a constant current source (as will be seen in reference to FIGURE 5, a constant voltage source may be utilized with a series resistor connected thereto). The second terminal of the secondary winding 112 is further connected to the anode of diode 122 which has the cathode thereof returned to source 126. The diode 122 provides a low impedance current path for the selective switching of tunnel diode 116 as will be described subsequently. The anodes of the output diodes 124 are also connected to the second terminal of the secondary winding 112. It should be understood also that the output diodes 124 may be connected to the first terminal of the secondary winding 112 as well as to the second terminal. The operation of the circuit would be substantially the same with the exception that the time delay of the coil 112 would be eliminated by connecting the diodes 124 to the first terminal of the winding 112. The cathodes of the output diodes 124 are connected to further windings 104' which are representative of the primary windings of coupling transformers in further NOR logic circuits. These windings 104' may be considered to be associated with the windings 112' shown coupled to the input diode 102. Therefore, to complete the circuit the diode 114' and tunnel diode 116' are illustrated.

In the operation of the NOR circuit, it is assumed that the reset pulse supplied by reset clock pulse source 118 via diode 114 is initially applied. The application of a reset pulse assures that tunnel diode 116 is in the high voltage state (see FIGURE 2). At a predetermined time period after the application of the reset clock signal, the clock pulse is applied by the clock pulse source 106. The application of the clock pulse to transformer winding 104 effectively samples the input diodes 102. That is, since a clock pulse is a negative-going pulse, the cathode of the input diode 102 is effectively supplied with a negative-going pulse. If the input signal previously applied to the anode of input diode 102 is a low level signal (which may be indicative of a binary zero, for example) the clock signal will not be sufficiently negative to permit diode 102 to be forward biased thereby providing a current through the primary winding 104 of the transformer T1. However, on the other hand in the event that a high level signal (which may be indicative of a binary one for example) is applied to the anode of the input diode 102, the negative-going clock pulse forward biases the diode 102 whereby a current flows through the primary winding 104 of transformer T1. In accordance with the typical "dot" convention, dots are placed at the ends of the primary and secondary windings of transformer T1. This indicates that where the dot is on the primary winding, a current is flowing into the winding; and a dot on the secondary winding indicates the terminal where current is flowing out of the winding when current is flowing into the dot on the primary winding.

When a current is drawn through primary winding 104 of the transformer T1 due to the clocking of the source 106 and the application of a high level input at the anode of diode 102, a current is produced in the secondary winding 112 of transformer T1. It will be seen that diode 114 is reversed biased due to the application of the negative steady-state signal to the anode thereof by reset clock pulse source 118. Consequently, current flowing through the winding 112 must be supplied via tunnel diode 116. It will be seen, that the current through the winding 112 will flow from ground, through tunnel diode 116, through coil 112, through diode 122, to the potential source 126. Source 126 may be a fixed negative potential source, or in the alternative, a pulsed source which is pulsed at the time of the clock source 106. Clearly, with the production of the current through winding 112, the tunnel diode 116 is switched from the initial high voltage point (see FIGURE 3 operating point 300) to the low level operating point (see FIGURE 3 operating point 302) since current is effectively drawn from the tunnel diode. When the tunnel diode 116 switches from the high voltage operating point 300 to the low voltage operating point 302, the anode potential thereof drops from approximately +450 millivolts to aproximately +50 millivolts. Clearly, the anode potential of the tunnel diode 116 is the potential applied to the anode of output diodes 124. As was previously discussed, when the output diodes 124 are pulsed (as with the case of input diodes 102) current will flow through the coil 104' only when a high level voltage is applied to the anode of the output diode 124. Thus, the output produced at diode 124 is dependent upon the state of tunnel diode 116 and this condition is indicated by the anode potential at the tunnel diode.

Figure 2:
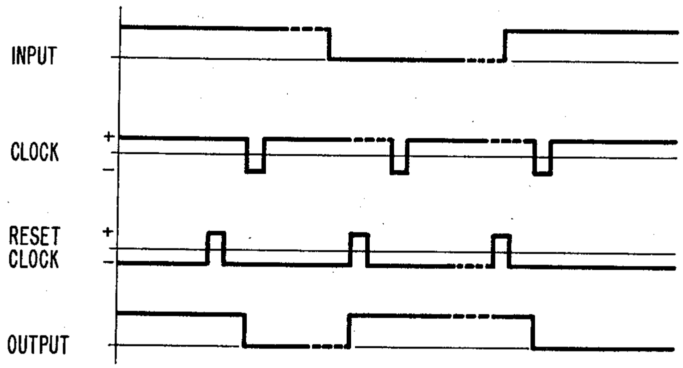
FIGURE 2 is a timing diagram for the pulses applied to and supplied by the circuit of FIGURE 1.

Referring now to FIGURE 2, there is graphically shown a timing diagram of the pulses for the circuit. Clearly, these pulses are shown for a preferred method of operation. As described, it will be seen that the reset pulse is a positive-going pulse and, timewise, prior to an associated negative-going clock pulse. It will be seen that the output signal goes to the low level with the application of a clock pulse only when the input was in the high level. In contradistinction thereto, it will be seen that the output signal remains at the high level when the input signal is a low level signal. It will be seen that the inversion of the input signals is produced by the circuit. The only criteria for the signals is that the negative-going clock pulse must be sufficiently large that the diode 102 is sufficiently forward biased to draw current through winding 104 when the clock pulse is supplied. Similarly, the positive-going reset pulse must be sufficiently large that the tunnel diode 116 will be reset to the high voltage condition when the reset pulse is supplied. Of course, the magnitudes of the signals are interdependent so that the diodes are not continually biased improperly. These criteria are, in part, determined by the magnitude of the input and output signals desired.

If the input diodes 102 are considered to be germanium and have a forward voltage drop of about 250 to 300 millivolts (see FIGURE 4 and attendant description), little or no current flows therethrough until this breakpoint (or threshold) is exceeded. Moreover, the low and high level input signals are about +50 and +450 millivolts, respectively. Therefore, if clock source 106 supplies a signal having a base line potential of about +200 millivolts or more, diodes 102 are always reverse biased (or at least zero biased) and negligible current flows in winding 104. On the other hand, if source 106 supplies a negative pulse having a peak magnitude of about −200 millivolts, diodes 102 will be zero biased by a low level input signal (forward voltage drop of only 250 millivolts and negligible current). A high level signal will, however, forward bias diodes 102 by producing a forward voltage drop of about 650 millivolts and a very substantial current flow through winding 104. Of course, if a silicon or other type of input diode having higher or lower breakpoint forward drops is utilized, the potentials supplied by source 106 may be altered to provide proper operation.

Figure 3:
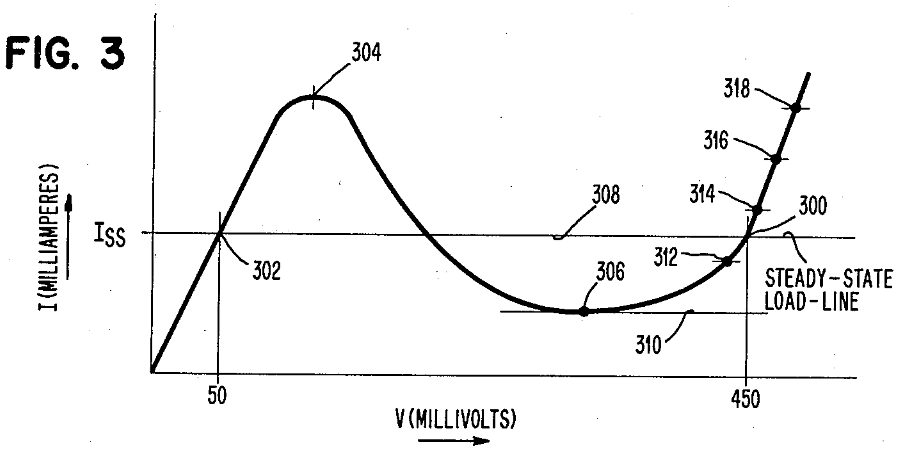
FIGURE 3 is a graphical representation of a V—I characteristic for a typical tunnel diode.

Referring now to FIGURE 3, there is shown a graphical representation of the voltage-current characteristics of a typical tunnel diode. A tunnel diode which may be utilized in the circuit is the G.E. 1N2941. The characteristic comprises the peak voltage point 304 and the valley voltage point 306. Between these two operating points is the so-called negative resistance region. To the left of peak voltage point 304 (with lower voltage levels) is the low voltage state; to the right of valley voltage point 306 (with higher voltage levels) is the high voltage state. The load line 308 represents the ideal steady-state constant-current supplied by source 120 in FIGURE 1. This load line intersects the V–I characteristic at both the low and the high voltage conditions thereby providing bistable operation. The intersection of the load line 308 and the V–I characteristic in the high voltage condition at operating point 300 represents the operating point at which the tunnel diode 116 (FIGURE 1) is initially biased. The intersection of the load line 308 and the V–I characteristic in the low voltage condition represents the operating point 302 to which the tunnel diode 116 is switched when current is drawn through coil 112. It should be clearly understood, of course, that the load line 308 is merely indicative of the load line under steady-state conditions and the application of a current by source 120. Clearly, when the input diodes are being sampled and when currents are flowing through the transformer coils, a dynamic load line is obtained. However, in the interest of simplicity and clarity this dynamic load line is eliminated since a further discussion of transient analysis would be required which is not necessary for the understanding of the operation of the circuit.

Also graphically shown in FIGURE 3 is a plurality of other output load lines which intersect the V–I characteristic of the tunnel diode in the high voltage condition. These output lines 310, 312, 314, 316 and 318 are independent of load line 308 and represent the levels of the output current with various combinations of output diodes. That is, with only a single diode output from the tunnel diode the output load line may be represented by line 318. Similarly, two output diodes may be represented by the output load line 316. Likewise, three and four output diodes would be represented by the load lines 314 and 312, respectively. The important characteristic to keep in mind is that the load lines are continually moving down along the V–I characteristic with more output diodes in the fan-out network. That is, the greater the number of diodes in the fan-out network, the greater the output load on the tunnel diode. Thus, there is the possibility of having a number of output diodes such that the output load line is represented by a load line, as for example 310, which falls below the valley point 306. This load line 310 represents the current load which causes the tunnel diode to be switched back to the low level operating condition automatically when an output is produced. Thus, with fan-out networks having load lines represented by load lines 312, 314, 316 and 318 the circuit provides non-destructive readout. On the contrary, the load line level represented by load line 310, or any load line below line 310 would represent a destructive readout network. That is, the circuit would operate such that when an output was derived the tunnel diode would have to supply such a magnitude current that it would be automatically switched back to the low voltage condition. These alternative methods of operation are each valid methods of operation and have distinct advantages in different applications. It must be understood however, that if the destructive readout system is utilized, the tunnel diode 116 (FIGURE 1) must be reset prior to the sampling of the input diodes or the output diodes. However, if the non-destructive readout method is utilized the tunnel diode need not be reset but rather the information can be obtained therefrom automatically. The destructive readout or non-destructive readout (DRO or NDRO) represent what might be termed asynchronous or synchronous methods of operation. That is, in the destructive readout method, a synchronous reset clock pulse must be supplied at all times prior to the reading or writing of information into the system.

In the event that outputs represented by load lines 310–318 are dynamically desired in conjunction with the static load line 308, a suitable pulse source may be coupled to the tunnel diode in order to raise or lower the static load line as desired. A typical application might provide a pulsed source coupled to the anode of tunnel diode 116 (FIGURE 1) which source is synchronized with the clock source connected to winding 104. This source would, thus, supply the current necessary to permit the shifting of the load line during driving of the tunnel diode or the taking of outputs therefrom.

Figure 4:
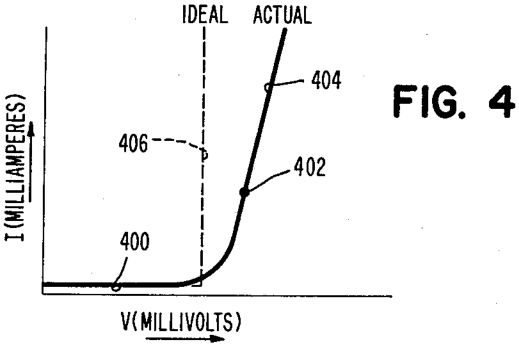
FIGURE 4 is a graphical representation of a V—I characteristic of a typical diode.

Referring now to FIGURE 4, there is shown a graphical representation of the V–I characteristic of a typical diode utilized in the circuit. A diode which may be utilized throughout the circuit is the Sylvania D4121. The ideal graph is shown in dashed line and designated by 406. In this ideal V–I characteristic it will be seen that the diode is effectively OFF until a certain switching point is reached at which time the diode is switched and becomes a constant voltage device allowing an infinite current path. However, this ideal characteristic is virtually unobtainable in diodes presently available and the actual graph is shown and represented by 404. On the actual characteristic 404, the operating point 400 is designated. This operating point 400 is the point to which the diodes are biased when they are reverse biased and represents about 150 millivolts. Clearly, little or no current flows through the diode at this point. In the alternative, when the diodes are forward biased they operate at the operating point 402 represented by about 300 millivolts at which point it is clear they can pass a substantial amount of current (on the order of 1.0 milliampere).

Figure 5:
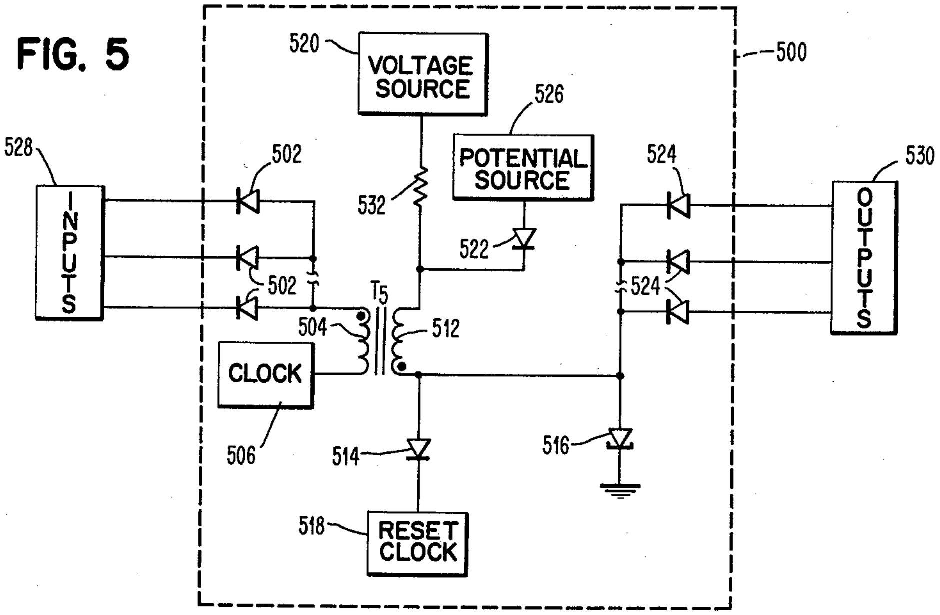
FIGURE 5 is another embodiment of the invention and is particularly designed to operate with negative input signals.

Referring now to FIGURE 5, there is shown a circuit which operates substantially similar to the circuit shown in FIGURE 1 but is responsive to negative-going input signals instead of positive-going input signals. The embodiment of the invention shown in FIGURE 5 is effectively the inverse of the embodiment shown in FIGURE 1. Thus, the input diodes 502 have the cathode thereof connected to input device 528. Input device 528 is shown as a single block, but is diagrammatically representative of either a single circuit or a plurality of actual input circuits. The anodes of the input diodes 502 are then connected to a first terminal of the primary winding 504 of transformer T5, another terminal of which is connected to the clock pulse supplying source 506. The secondary winding 512 of transformer T5 has one terminal thereof connected to a voltage source 520 via resistor 532. This voltage source and series resistor effectively produce a constant current at the terminal of the secondary winding 512. The same terminal of the secondary winding is connected to the cathode of diode 522. The anode of diode 522 is connected to a potential source 526. As will become obvious, diode 522 presents a low impedance current path when the tunnel diode is drawing current. Another terminal of the secondary winding 512 is coupled to the anode of diode 514. The cathode of diode 514 is connected to the reset clock pulse source 518. To the same terminal of secondary winding 512 as the anode of diode 514, there is connected the anode of tunnel diode 516. The tunnel diode 516 then has the cathode thereof connected to ground. Also connected to this terminal of secondary winding 512 are the cathodes of the output diodes 524. The anodes of output diodes 524, again, are all connected to the output device 530. Once again, output device 530 is shown as a single block but is representative of a plurality of individual or interdependent output circuits. As is the case of the circuit shown in FIGURE 1, the dashed outline 500 is representative of a single stage of the circuit.

The operation of the embodiment shown in FIGURE 5 is substantially similar to the operation of the embodiment shown in FIGURE 1, but the polarities of the signals are reversed. Thus, assuming that the tunnel diode 516 is initially reset by the reset signal (see FIGURE 6)

supplied by source 518 via diode 514, tunnel diode 516 is set to the low voltage condition (see FIGURE 3). Thus, the anode of tunnel diode 516 exhibits a low voltage (approximately 50 millivolts) which potential is applied to the cathode of the output diodes 524. (It is to be remembered that the output diodes 524 are similar in operation to the input diodes 502.) After the tunnel diode 516 is set to the low voltage condition, a clock pulse is supplied by source 506 and the effect thereof is passed through primary winding 504 to the input diodes 502. The clock pulse is a positive-going pulse and is applied to the anodes of the input diodes 502. In the event that the cathodes of input diodes 502 have a high level signal applied thereto (as for example if the preceding tunnel diode was biased to the high voltage condition) the diodes would be back-biased and substantially no current would flow through the primary winding 504. Consequently, little or no current would be produced in winding 512 whereby the tunnel diode 516 would remain in the low voltage or OFF condition. On the other hand, if the signal at the cathode of the input diodes 502 is a low level signal, current will flow from source 506 through winding 504 through diode 502 to the input device 528. This current through coil 504 will produce a similar current in coil 512. Inasmuch as there is a 4:1 voltage step-down ratio, the current through winding 512 can be four times as great as the current through winding 504. Since the voltage source 520 and series resistor 532 are effectively a constant current source, current is supplied from source 526 via low impedance diode 522 through coil 512. Diode 514 is reverse-biased due to the application of a positive potential at the cathode thereof by reset source 518 whereby the current through winding 512 must flow through tunnel diode 516. As the current increases through the tunnel diode, it is clear that the tunnel diode will switch from the low voltage condition to the high voltage condition when the current therethrough exceeds the current requirement at the peak forward voltage point 304 (see FIGURE 3). Thus, a high level potential will be applied to the cathodes of the output diodes 524. Moreover, it will be seen that the high level output at diodes 524 is only obtained when the input signal at the cathode of at least one input diode 502 is a low level input. Consequently, it will be seen that the circuit also provides an inversion function.

Figure 6:
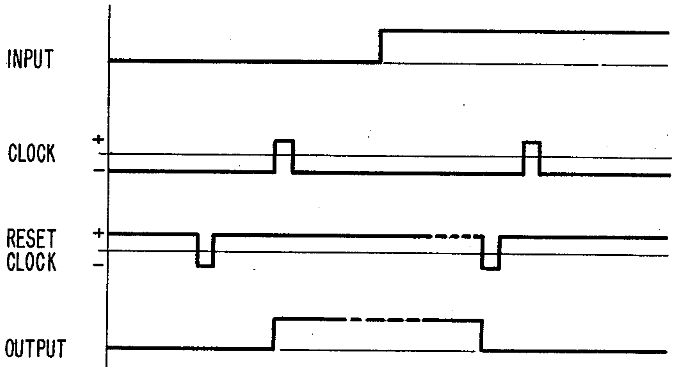
FIGURE 6 is a timing diagram of the pulses applied to and supplied by the circuit of FIGURE 5.

Referring now to FIGURE 6 the signals applied to and generated by the circuit are shown in graphical form. These signals are self-evident in the operation of the circuit embodiment shown in FIGURE 5. In addition, it will be seen that these signals are substantially the inverse of signals shown in FIGURE 2 and used in the description of the embodiment shown in FIGURE 1.

Figure 7:
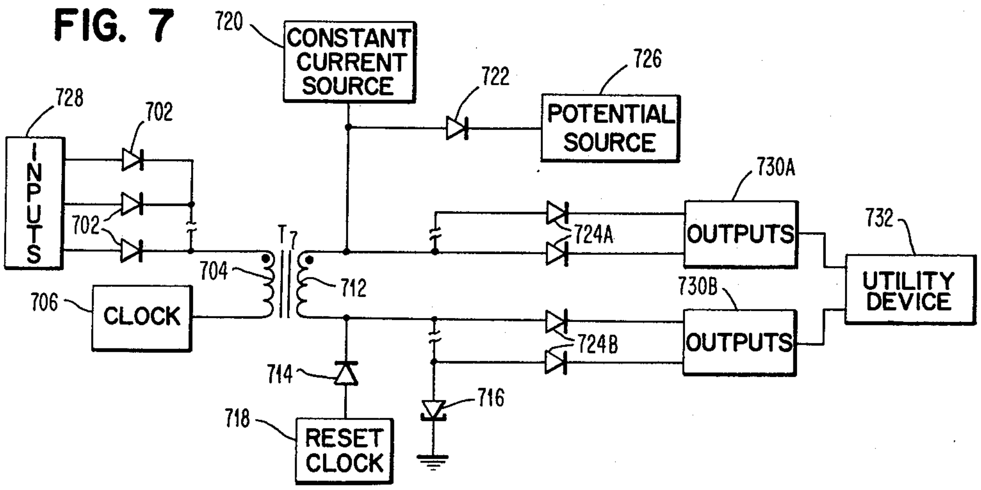
FIGURE 7 is another embodiment of the invention utilizing an alternative arrangement of the circuit outputs.

Referring now to FIGURE 7 there is shown a further embodiment of the invention. In particular, the embodiment of the invention shown in FIGURE 7 suggests a different method of obtaining the output signals. It should be understood that the principle illustrated by FIGURE 7 may be incorporated into the embodiments shown in either FIGURE 1 or FIGURE 5. However, for purposes of explanation, the particular output obtaining method shown in the embodiment of FIGURE 7 utilizes substantially the predescribed embodiment shown in FIGURE 1. It will be seen in FIGURE 7, that the input device 728 is similar to the input device 528 previously described relative to FIGURE 5. That is, input device 728 is shown as a single block, but is actually representative of a plurality of individual or independent input circuits. The input device 728 is connected to the anodes of input diodes 702, the cathodes of which are connected to the primary winding 704 of coupling transformer T7 Another terminal of the primary winding 704 is connected to the clock pulse source 706. Once again, the terminals of the secondary winding 712 of the transformer T7 are connected as shown in FIGURE 1. That is, one terminal of the secondary winding 712 has connected thereto a constant current source 720, a low impedance diode 722 and a source 726 which is connected via the diode 722. Another terminal of the secondary winding 712 has connected thereto the cathode of diode 714 which has the anode thereof connected to reset clock pulse source 718. Also connected to the secondary terminal is the anode of tunnel diode 716 which is connected to ground by the cathode thereof. The distinction between the embodiments shown in either FIGURES 1 or 5 is now evident. That is, outputs are derived at both of the terminals of the secondary winding. Thus, at one terminal thereof output diodes 724*a* have the anodes thereof connected to the secondary winding terminal. The cathodes of the output diodes 724*a* are connected to a first output device 730*a*. Further output diodes 724*b* have the anodes thereof connected to another terminal of the secondary winding 712. The cathodes of the output diodes 724*b* are connected to a second output device 730*b*. The major distinction here is that the current flow through winding 712 causes an inherent time delay, the length of which is variable, between the reception of signals at the separate terminals of the secondary winding. That is, the output signals arriving at diode clusters 724*a* and 724*b* arrive at different times. Thus, these signals which are produced at the output devices 730*a* and 730*b* are also produced at different times. The output signals provided by output devices 730*a* and 730*b* are then presented to a utility device 732. The utility device may be any of the number of different devices. For example, if the output from the devices 730*a* and 730*b* are to be reunited and fed back into a further circuit as is the case in many computing machines, utility device 732 may be a type of synchronizer many of which are known in the art. Thus, the earlier appearing signal would be delayed until the arrival of the later appearing signal. Another suggested operation of utility device 732 would be to operate as a pulse forming circuit. That is, the arrival of the first input signal, for example from input device 730*a*, would trigger the utility device 732 and create the leading edge of a pulse. The arrival of the latter pulse from, for example output 730*b*, would then be used to retrigger or reset the utility device 732 thereby providing the trailing edge of a pulse. In view of the extremely short time delay between the arrival of the various pulses an extremely narrow pulse may be provided. Theoretically, pulses having widths of less than a single nanosecond (1.0 nsec.) are obtainable. These are only illustrative examples of the type of utility device 732 which may be utilized with the output shown in the embodiment of FIGURE 7.

It should be clear that the material described supra is meant to be illustrative only and is not limitative of the scope of the invention. Moreover, various changes may be suggested to those skilled in the art. For example one change which may be suggested to those in the art is the inclusion of the coil 108 and the capacitor 110 as shown dashed in FIGURE 1. The use of these components is for practical purposes primarily. That is, with cheaper or less expensive diodes 102, a small capacitor current may flow through the diodes when the diodes are in the low voltage condition whereas preferably no current should be flowing therethrough. To compensate for this spurious current flowing through coil 104, the coil 108 is connected to ground via capacitor 110. Thus, it will be seen that the capacitor 110 provides a parallel path to the capacitor current passing through diode 102. Moreover, the coils 104 and 108 are balanced to a central tap which is connected to the clock pulse source 106. Therefore, any spurious capacitor current flowing through a diode 102 having a high capacitance for the application may be compensated for by providing a parallel capacitor circuit. It will be clear that when a clock pulse is provided by source 106 to sample the inputs at diodes 102, substantially the same current will flow through the winding 104 as is produced thereby in the absence of winding 108 whereby switching of the tunnel diode (if so required) will be provided with no deleterious effects due to the parallel circuit comprising components 108 and 110.

Moreover, the connections of the output diodes to the secondary winding of the coupling transformer may be made at any terminal. That is, the output diodes may be connected directly to the tunnel diode electrode (one end of the secondary winding) or, in the alternative, the output diodes may be connected to another terminal of the secondary winding. Furthermore, the output diodes may actually be connected to a combination of different terminals of the secondary winding of the coupling transformer. The choice of connection is dependent upon design criteria and does not alter the operation of the logic NOR circuit. As noted supra, these are only illustrations of the changes which may be made in the circuit in order to improve certain of the operating characteristics but does not depart from the principle of operation nor from the scope of the invention.

Having thus described the invention what is claimed is:

1. A logic circuit comprising, a tunnel diode having two stable conduction states, a transformer, an energy source, the secondary winding of said transformer connected between said tunnel diode and said energy source, a first pulse source for supplying signals to said tunnel diode for determining the conduction state thereof, a second pulse source, said first and second pulse sources adapted to produce pulses at different times, input signal supplying means, the primary winding of said transformer connected between said input signal supplying means and said second pulse source, said primary winding adapted to pass a signal therethrough and thereby generate a signal in said secondary winding only in response to a pulse supplied by said second pulse source in the absence of a signal supplied by said input supplying means which signal by said input supplying means effectively blocks said pulse at said second pulse source and inhibits the passage of a signal through said primary winding, and means connected to said secondary winding for producing output signals.

2. In combination, means for selectively supplying input signals, first selectively variable source means, first winding means connected between said first source means and said input means such that said input means may be selectively sampled by said first source means in order to selectively produce signals in said first winding in accordance with the input signals supplied by said input means, a bistable semiconductor device, second selectively variable source means coupled in parallel with said semiconductor for selectively determining the state in which said semiconductor resides, a substantially constant energy source, second winding means connected between said semiconductor and said substantially constant energy source such that said semiconductor is biased in the bistable mode of operation, said first and second windings comprising a transformer and being inductively coupled such that signals passing through said first winding in response to the sampling of said input means create signals in said second winding capable of switching said semiconductor state, and means connected to said second winding for supplying output signals in accordance with the state of said semiconductor.

3. In combination, a first diode cluster for supplying input signals having two different levels, a second diode cluster for supplying output signals, having two different levels, first selectively variable source means, first winding means connected between said first source means and said first diode cluster whereby said first diode cluster may be selectively sampled by said first source means to detect the level of the input signal, a bistable semiconductor device having two different conduction states, second selectively variable source means coupled to said semiconductor for initially biasing said semiconductor to one conduction state, a substantially constant energy biasing source, and second winding means connected between said semiconductor and said substantially constant energy source, said first and second windings being inductively coupled whereby a signal first passing through said first winding in response to the sampling of said first diode cluster creates a second signal in said second winding which second signal changes the conduction state of said semiconductor, said second signal being produced only in response to said first signal, said first signal being produced only when the input signals have a level which permits current flow through said first diode cluster and said first winding when said first diode cluster is sampled by said first variable source.

4. A logic NOR circuit comprising, a tunnel diode having two stable conduction states, a transformer, a bias source, the secondary winding of said transformer connected between said tunnel diode and said bias source, a first pulse source for supplying signals to said tunnel diode to initially bias said tunnel diode to one conduction state thereof, a second pulse source, input signal supplying means exhibiting different operating conditions in accordance with the presence or absence of an input signal, the primary winding of said transformer connected between said input supplying means and said second pulse source and adapted to conduct a current signal only when said input supplying means is conditioned to receive a pulse from said second pulse source as determined by the presence or absence of an input signal which controls the operating conditions of said input supplying means, and means for producing output signals in accordance with conduction state of said tunnel diode which state may be changed by the generation of a signal in said primary winding.

5. A NOR logic circuit comprising, input means for supplying signals having two distinct levels, first source means for supplying signals having two distinct levels, said two distinct levels of the signals supplied by said first source and said input means being substantially similar, first winding means connected between said input means and said first source means such that a signal may be produced therein only in response to each of said input means and said first source means supplying signals having different levels, second winding means inductively coupled to said first winding means for having a signal produced therein in response to the production of a signal in said first winding, a tunnel diode connected to said second winding, bias means connected to said tunnel diode via said second winding to bias said tunnel diode in the bistable operating mode such that two stable operating conditions are exhibited, second source means connected to said tunnel diode to selectively establish the initial stable operating condition of said tunnel diode which may be changed from said initial stable operating condition only in response to the production of a signal in said second winding.

6. A NOR logic circuit comprising, unilaterally conducting input means for supplying signals having two distinct levels, first source means of supplying signals having two distinct levels, said two distinct levels for the signals supplied by said first source and said input means having similar orders of magnitude, first winding means connected between said input means and said first source means such that a signal may be produced therein only in response to at least one of said input means and said first source means supplying a signal having a different level than the signal supplied by the other of said input means and said first source means such that said signal produced may be passed by said unilaterally conducting input means, second winding means inductively coupled to said first winding means for having a signal produced therein in response to the production of a signal in said first winding, a tunnel diode connected to said second winding, bias means connected to said tunnel diode via said second winding to bias said tunnel diode in the bistable operating mode such that two stable operating conditions are exhibited, and second source means connected to said tunnel diode to selectively establish the initial stable operating condition of said tunnel diode, said tunnel diode and said bias means arranged such that the operating condition of said tunnel diode may be changed from said initial stable operating condition to the other stable operating condition only in response to the production of a signal in said second winding.

7. The logic circuit recited in claim 1 wherein the means for producing output signals may be connected to each terminal of said secondary winding.

References Cited by the Examiner

UNITED STATES PATENTS

| | | | |
|---|---|---|---|
| 2,782,404 | 2/57 | Bergmon | 340—253 |
| 3,027,465 | 3/62 | Lorenzo et al. | 307—88.5 |
| 3,050,636 | 4/62 | Sommerfield | 307—88.5 |
| 3,071,700 | 1/63 | Smith | 307—88.5 |

OTHER REFERENCES

R.C.A. Technical Notes: "Tunnel Diode Circuits for Electron Data Processing Systems," by Amodei et al., January 9, 1961.

Electronics "Tunnel Diode Logic Circuits," by Chow, June 24, 1960, pages 103–107.

ARTHUR GAUSS, *Primary Examiner.*

JOHN W. HUCKERT, BENNETT G. MILLER, *Examiners.*